Feb. 22, 1927. 1,618,215
K. MÜLLER
FREE WHEEL DEVICE AND BACK PEDAL BRAKE FOR CYCLES
Filed May 4, 1926 2 Sheets-Sheet 1
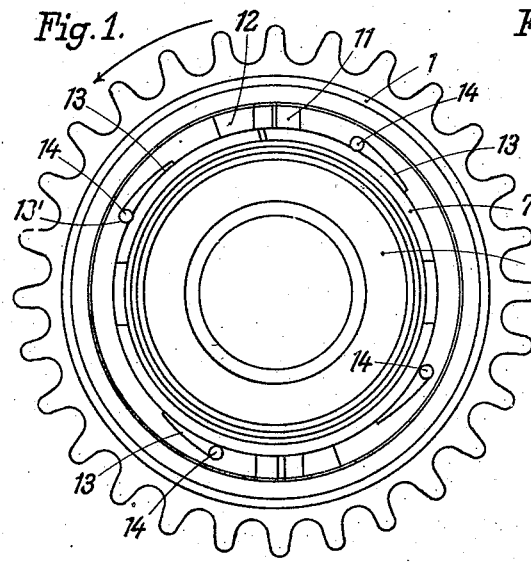
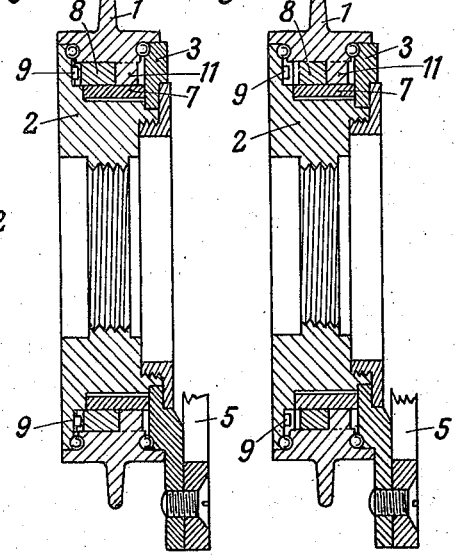
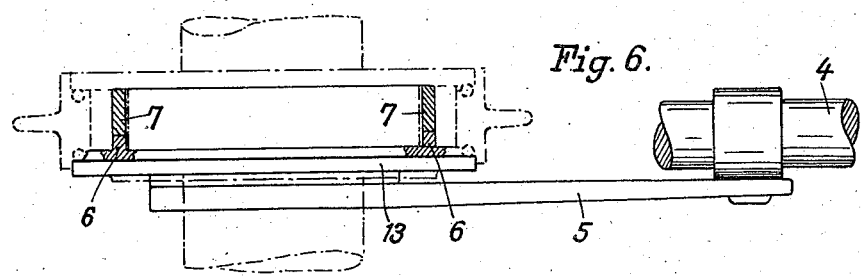
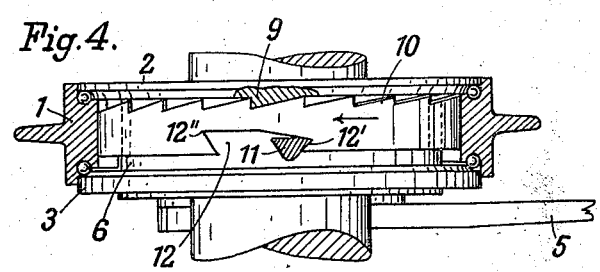
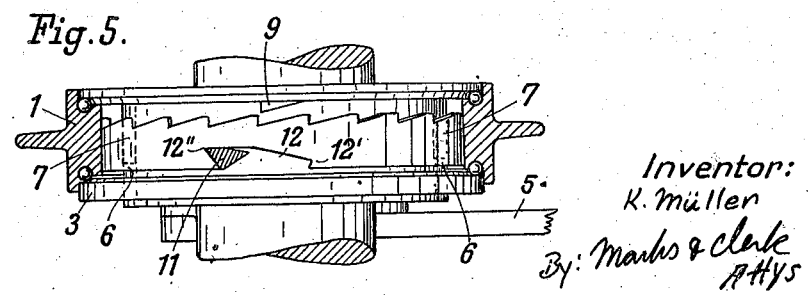
Inventor:
K. Müller
By: Marks & Clerk
Attys Feb. 22, 1927.　　　　K. MÜLLER　　　　1,618,215
FREE WHEEL DEVICE AND BACK PEDAL BRAKE FOR CYCLES
Filed May 4, 1926　　　2 Sheets-Sheet 2
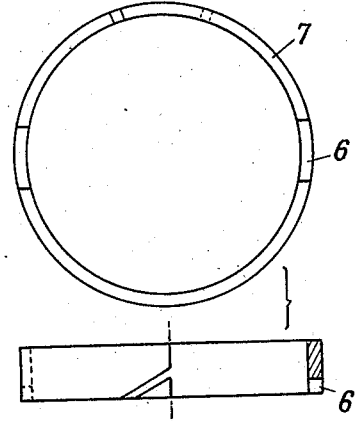
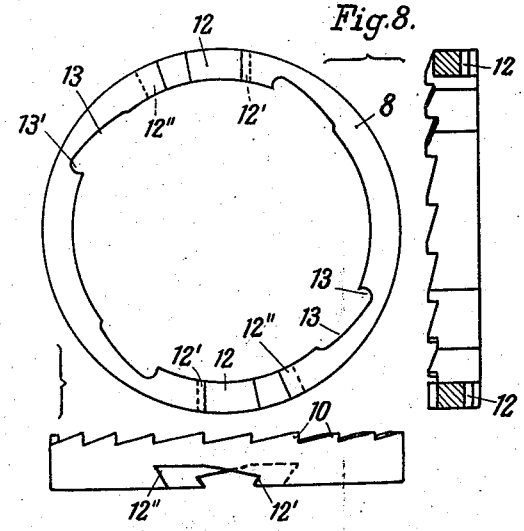
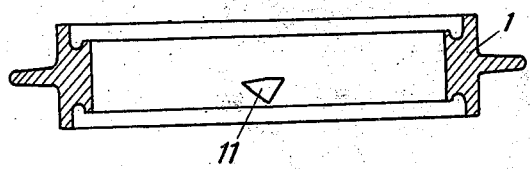
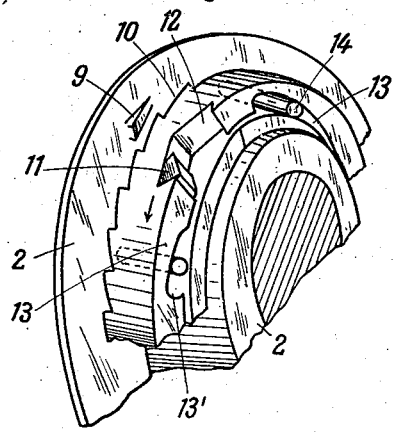
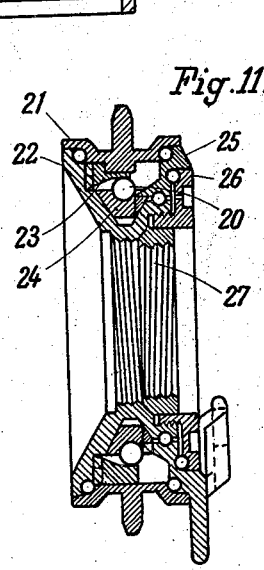
Inventor:
K. Müller
By Marks & Clark
Attys Patented Feb. 22, 1927.

1,618,215

UNITED STATES PATENT OFFICE.

KARL MÜLLER, OF KREIENSEN, GERMANY, ASSIGNOR TO ERICH MÜLLER, OF KREIENSEN, GERMANY.

FREE-WHEEL DEVICE AND BACK-PEDAL BRAKE FOR CYCLES.

Application filed May 4, 1926, Serial No. 106,724, and in Germany January 17, 1925.

The invention relates to cycles, which have the free-wheel device and back-pedal-brake arranged within the rim of the chain-wheel, which on its part is running freely on the hub and placed on a bearing ring, which is rigidly connected to the frame. This latter bearing ring holds an elastic brake-ring, whereat a thrust-collar is arranged between the chain-wheel and brake-ring.

The invention concerns a cycle of this kind, the bearing-ring of which is constructed as preserving-ring for the whole casing and fitted with projections, which mesh into corresponding grooves of the brake-ring. The thrust collar is constructed as toothed-ring in the teeth of which hub-projections and in the tappet-guide of which cams of the chain-wheel are in mesh, whilst rollers are bedded in the inside surface of the thrust-collar. When back-pedaling, these rollers come out of their bearings in the sliding-surface of the thrust-collar and roll off on the oblique sliding surface, whereby the brake-ring is pressed together and the hub will be squeezed and braked.

On arranging the rollers in the inside surface of the thrust-collar, which is designed as laterally removable toothed clutch-ring, these rollers on back-pedaling, roll off on the oblique surfaces of the thrust-collar and press the brake-ring against the hub. Thus it is attained, that the chain-wheel with free-wheel-device and back-pedal-brake can easily be fitted up in place of an ordinary chain-wheel, as it is in the direction of the axle made very flat, because the two principal parts, namely the free-wheel-gear and back-pedal-brake are arranged one around the other in the same cross plane.

Instead of the rollers balls of course may also be employed and in case of such ball-bearing piercing grooves are not necessary, and it is sufficient to apply grooves at suitable distances, as for instance 10 m/m.

The drawings give examples of two kinds of carrying out the object of the invention. Fig. 1 shows an embodiment of the invention in side view with laterally bent bearing-ring. Fig. 2 represents a cross section of the driving position, and Fig. 3 a cross section of the free-wheel running position. Figs. 4 and 5 are the corresponding front-elevations to Figs. 2 and 3. Fig. 6 is a schematic delineation, which shows the arrangement of the rigid and movable parts in relation to each other. (The movable parts are indicated as:—.—.—.—.—.) Figs. 7 to 9 give particulars and Fig. 10 shows an evident delineation of the action of the back-pedal-brake. Fig. 11 shows another way of carrying out the invention, where balls are employed instead of rollers.

The chain-wheel (1) is by means of ball-bearings running freely on the hub (2) and the bearing-ring (3). This bearing-ring is rigidly connected with the frame (4) with the aid of a lever (5). On the bearing-ring projections (6) are provided, which are brought into mesh with the corresponding grooves of the elastic ring (7), which is projecting into the interior of the free-wheel-device and at the same time lightly embracing the brake-hub (2). Between the chain-wheel (1) and the ring (7) a toothed ring (8) is sliding which is of particular importance for the action of the free-wheel-drive as well as for the back-pedal-brake.

If the chain-wheel 1 is driven by the chain, the cams 11 of the chain wheel push against the guide $12^1$ of the toothed ring 8 and the teeth 9 of the hub 2 are coupled with the teeth 10 in the toothed ring 8 (Figs. 2 and 4). In the free-wheel position the toothed ring 8 is on account of the stoppage of the chain wheel separated by the cams 11 of the chain wheel 1, as the cams 11 press the toothed ring 8 at the score $12^{11}$ of the guide 12 to the right, so that the teeth 10 of the toothed ring 8 are kept out of mesh with the teeth 9 of the hub 2.

The brake is employed by back-pedaling in this way, that the rollers (14) bedded in the inside surface of the toothed ring, come out of their roller bearings (13') on account of the friction caused by the backwards motion and roll off on the sliding surface (13), which becomes more and more narrow between the toothed ring and elastic ring; by this means the rollers (14) exert pressure on the elastic ring (7), which is therefore pressed together and at the same time squeezes and brakes the hub (2).

The rollers (14) may of course be replaced by other parts, which are able to cause squeezing and braking of the hub (2). The same may be the tappet guides (12) and the cams (11), as the left- or right-hand motion may also be effected with other already known means.

As to the way of operating in Fig. 11 there are balls (20) provided instead of rollers (14). (21) represents the spur-gear, (22) the core of the casing, (23) the thrust-collar provided with teeth (24) the elastic brake-ring, (25) the bearing ring, (26) the closing ring, which keeps together the whole unit, and (27) the counter-ring. The action is the same as in the embodiment illustrated in Figs. 1–10.

Claims:

1. In a free-wheel device, a frame, a hub having lateral teeth, a chain wheel rotatable on the hub, a bearing ring rigidly connected with said frame, an elastic brake ring held in position by said bearing ring, a laterally toothed ring interposed between said chain wheel and said brake ring having internal oblique sliding spaces, and rollers adapted to roll on the inside of the laterally toothed ring and press said brake ring against said hub.

2. In a free-wheel device, a frame, a hub having lateral teeth, a chain wheel rotatable on the hub, a bearing ring rigidly connected with said frame, an elastic brake ring held in position by said bearing ring, a laterally toothed ring interposed between said chain wheel and said brake ring having internal oblique sliding spaces, and balls adapted to roll on the inside of the laterally toothed ring and press said brake ring against said hub.

In testimony whereof I have signed my name to this specification.

KARL MÜLLER.